United States Patent

Takebe et al.

[11] Patent Number: 5,912,968
[45] Date of Patent: Jun. 15, 1999

[54] HANDSET UNIT AND ASSEMBLY METHOD THEREFORE

[75] Inventors: Masanori Takebe; Takahiro Kudo, both of Tokyo, Japan

[73] Assignee: Uniden Corporation, Tokyo, Japan

[21] Appl. No.: 08/852,352

[22] Filed: May 7, 1997

[30] Foreign Application Priority Data

Sep. 6, 1995 [JP] Japan .................................. 8-236895

[51] Int. Cl.⁶ .................................................. H04M 1/00
[52] U.S. Cl. ............................................ 379/435; 379/433
[58] Field of Search ............................ 379/433, 428, 379/434, 435, 436

[56] References Cited

FOREIGN PATENT DOCUMENTS

| | | | |
|---|---|---|---|
| 62-261260 | 11/1987 | Japan | 379/433 |
| 63-300652 | 12/1988 | Japan | 379/433 |
| 5-110646 | 4/1993 | Japan | 379/433 |
| 5-130193 | 5/1993 | Japan | 379/433 |
| 6-268548 | 9/1994 | Japan | 379/433 |

*Primary Examiner*—Jack Chiang
*Attorney, Agent, or Firm*—McDermott, Will & Emery

[57] ABSTRACT

For use with communications equipment, a handset unit that does not require a mold solely for the preparation of a window member, does not incur increased manufacturing costs, can be manufactured without requiring a special step for mounting the window member only to a handset unit cover, and has a reinforced recess for engagement with a hook. The handset unit includes a window member (22B) and a body (22A) that are integrated to form a speaker holder (22). A recess (60) for engagement with a hook is provided at the lower end of the member (22). The window member is fixed to the handset cover near the recess (60).

19 Claims, 7 Drawing Sheets

HANDSET UNIT AND ASSEMBLY METHOD THEREFORE

FIELD OF THE INVENTION

The present invention broadly relates to a handset unit for use with communications equipment such as home, business, cordless, movable and wireless telephones and interphones, etc, and particularly to a handset unit comprising a keytop lighting mechanism. The present invention is further concerned with a method of assembling this handset unit.

DESCRIPTION OF THE RELATED ART

This type of handset unit is described for example in Patent Laid-Open Publication Sho 62-261260. This related art discloses a handset unit comprising a box-shaped body halved into a front cover and a rear cover, wherein a telephone component including a transmitter receiver is mounted and fixed in advance on a printed plate board, and this printed plate board is inserted between the two covers.

Some types of conventional handset units comprise keytop lighting mechanisms, for example Patent Laid-Open Publication Sho 63-300652, which describes a method of arranging a plurality of chip-formed, light-emitting diodes on the rear face of a key unit and guiding the light to the back of each keytop through a light-guiding block. Patent Laid-Open Publication Hei 5-110646 also describes at handset unit with a light-guiding plate mounted on the rear face of a key unit.

Another type or handset unit proposes a method of lighting all keytops from one end of the key unit instead of lighting each keytop from the back. This handset unit has among others the advantages that the number of components required for the lighting is reduced and the lighting construction in simplified.

Patent Laid-Open Publication Hei 5-130193 discloses this type of headset unit by providing a lamp on the end of the receiver on the keytop side and thereby lighting all keytops from one end of the receiver. The handset unit described in Patent Laid-open Publication Hei 5-130193 has provided thereon a diffusion lens on the tip of the receiver on the keytop side for guiding the light from the lamp to the keytop.

Recently, this diffusion lamp has been substituted with the process of fitting a transparent, translucent window member in one end of the receiver to guide the light from the lamp inside the receiver through the window member towards the wide keytop area.

However, if this translucent window member is simply treated as a component which is separate from the handset unit cover or other component, a special metal mold only for this window becomes necessary. This increases the manufacturing cost of the handset unit and reduces the practicability of manufacturing the handset unit as an additional process is required for fixing this window member to the handset unit.

It is possible to incorporate this transparent window member in the cover of the handset unit, but it is not advantageous for manufacturing purposes to form only the wall which faces the keytop side of the receiver out of transparent resin. Consequently, the related art offers no proposals for effectively incorporating the translucent window member in other members.

On the other hand, it is also necessary to give consideration to the reinforcement of this translucent window member. Preferably, this window member is arranged on the lower end wall of the ear portion, which is to be the receiver cover of the handset unit, so as to face the keytop. As this ear portion protrudes from the operator cover of the handset unit, a recess such as a channel or hole is formed in the translucent window member at the lower end of the ear portion, and a hook for wall hanging the handset unit is engaged with this recess.

However, the window component was highly likely to be exposed to mechanical injury during the repeated engagement between the wall-hanging hook and the recess of this window component, by reason that the strength of this translucent window member was not sufficient, and further, no proposals have been conventionally made for a means for sufficiently fixing the translucent window member to said opening. Accordingly, it was difficult to market a handset unit using this type of window member as a wall-hanging type. Furthermore, when offering this type of handset unit to the market as wall-hanging type, it was necessary to take countermeasures such as providing the hook recess on the rear face opposite to the ear portion of the handset unit.

Therefore, it is am object of the present invention to provide a handset unit for communications equipment which does not require any extra metal mold only for manufacturing said window member, which does not cause increase in the manufacturing cost, and which can be manufactured without requiring any special process only for attaching the window member to the handset unit cover.

Another object of the present invention is to provide a handset unit for communications equipment which comprises a reinforcement mechanism for preventing mechanical injury to the window member even when a recess is formed to which a hook is to engage with this window member.

Yet another object of the present invention is to provide a method for assembling a handset unit by which it is possible to assemble the handset unit without requiring any special process for attaching only the above-mentioned window member to the handset unit cover.

SUMMARY OF THE INVENTION

Through considerations conducted by the inventor regarding objects with which said translucent window member can be integrated, the inventor has reached the knowledge that the receiver holder which supports the receiver on the handset cover is most preferable therefor. This receiver holder exists inside the ear portion of the handset cover and is placed near the translucent window member, and is further advantageous for integration with this translucent window member as a relatively compact component.

In order to achieve the purposes above, the present invention is characterized in that the receiver holder for fixing the receiver in the handset cover and said translucent window member are shaped as one body.

In other words, the present invention is a handset unit comprising a handset cover, a receiver holder for fixing the receiver in the cover, a translucent window member to be fixed in the opening of the cover, and a lighting mechanism for supplying light from this opening to the front of said cover through this translucent light member, and is characterized in that said receiver holder and said translucent window member are formed as one body.

The present invention is further characterized in that when forming a recess on the translucent window member for engagement with a hook, this translucent window member is formed to be supported against the handset cover in the vicinity of this recess. Accordingly, it is possible to avoid mechanical injury to the translucent window member even when more force than necessary is applied to this recess, because the area in the vicinity of this recess has been reinforced.

In a preferred embodiment, the means for supporting said translucent window member against said handset cover is made of at least one of the following means: a mechanism for screwing this translucent window member to this handset cover, and a strip resisting the curvature of the translucent window member due to such force.

Said translucent window member may be supported by at least one of the following means: directly by said supporting means against said handset cover, and supported against the wiring substrate fixed to this handset cover.

Furthermore, in a preferred embodiment, the screwing mechanism above screws this translucent member via a boss protruding from the rear face of said handset cover toward said translucent member. Said strip also protrudes from the rear face of said translucent member toward the wiring substrate fixed to said handset cover, and the tip thereof contacts this wiring substrate.

According to another preferred embodiment, said lighting device is made of a first lighting body and a second lighting body, and a first area and a second area for storing these lighting boards respectively are provided on said translucent window member, thereby forming said recess between these areas. Furthermore, said boss protrudes from the rear of said handset cover adjacent to said recess.

In a further preferred embodiment, said recess is formed from the lower end of said translucent window member, and said strip protrudes from the lower end of this translucent window member toward the side of said substrate. Said boss is provided on the handset cover so as to be placed adjacent to the tip of said receiver cover facing said opening.

Even if the window member is not integrated with the receiver holder, it is possible to reinforce this window member by supporting the window member against said handset cover in the vicinity of the hook recess for engagement with a hook. This window member is preferably formed of translucent resin for guiding the light.

The present invention is further a method for assembling a handset unit comprising a first step for fixing a receiver holder holding the receiver inside the handset cover, a second step for arranging a translucent window member so as to cover the opening this handset cover, and characterized in that said first step and said second step are realized by the same step.

DESCRIPTION OF THE PREFERRED EMBODIMENT

Figure 1:
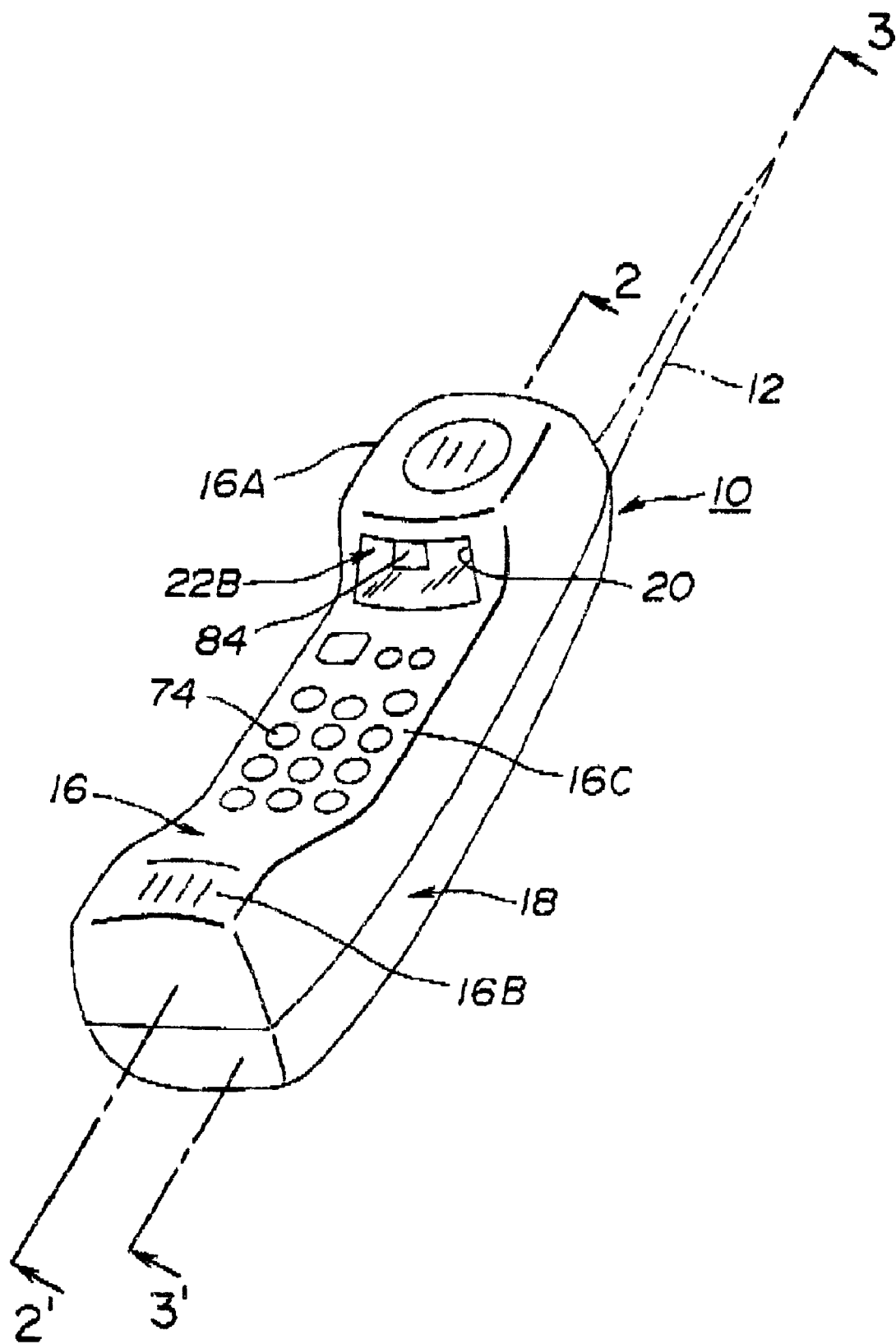
FIG. 1 is an aggregate perspective view of the handset unit relating to an embodiment of the present invention.

Now, a preferred embodiment of the present invention will be described with reference to the drawings. FIG. 1 is an aggregate perspective view or a handset unit used with cordless telephones. This handset unit comprises a handset cover 10, and has inside this cover a speaker (receiver), a microphone (transmitter), a substrate with a key unit contact circuit and a circuit between this receiver and transmitter, and an antenna 12 to be connected to the electric circuit of this substrate.

The handset cover is formed of halves which are a front cover 16 with keytop 74 arranged thereon and a rear cover 18. The front cover is formed of a receiver cover 16A covering the receiver, a transmitter cover 16B covering the transmitter, and an operator cover covering the operator whereon the keytop is exposed. The front cover and rear cover are respectively molded as one body out of resin. Receiver cover 16A of the front cover bulges from the operator cover 16C so as to form the portion for placing the user's ear thereto.

Figure 2:
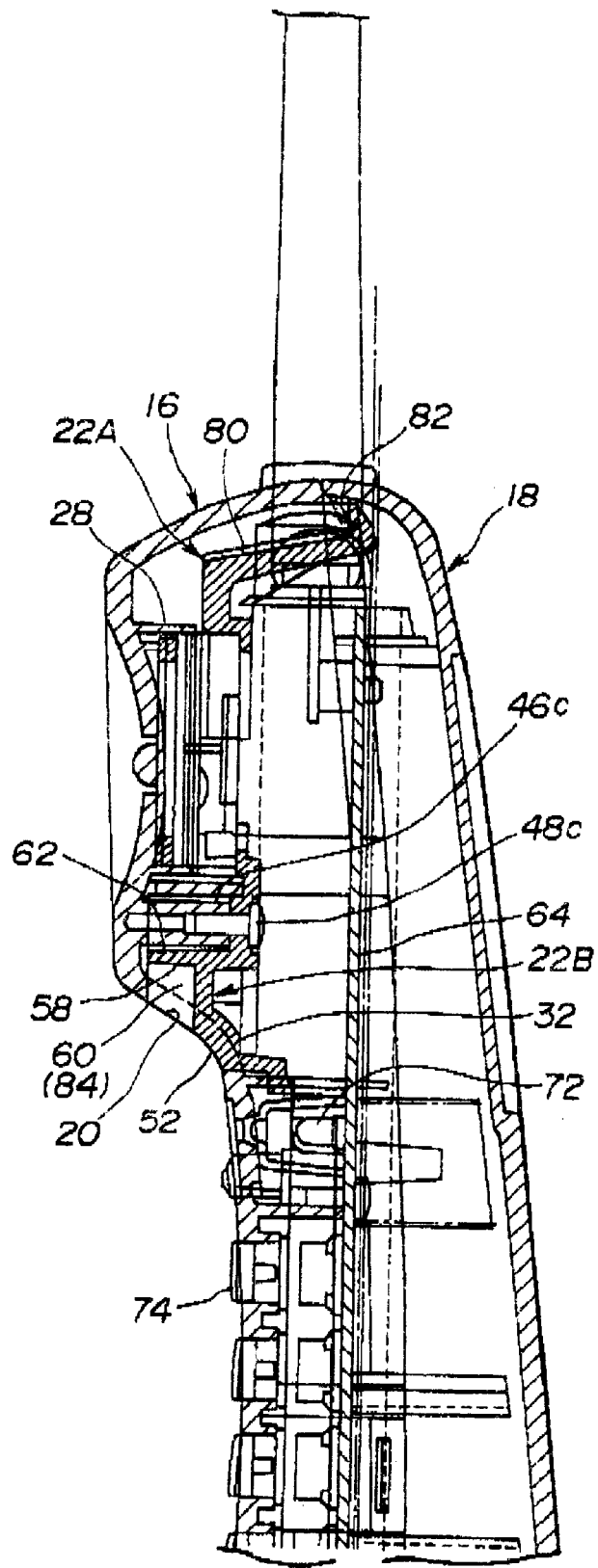
FIG. 2 is a cross section of the handset unit in FIG. 1 along line 2–2'.
Figure 3:
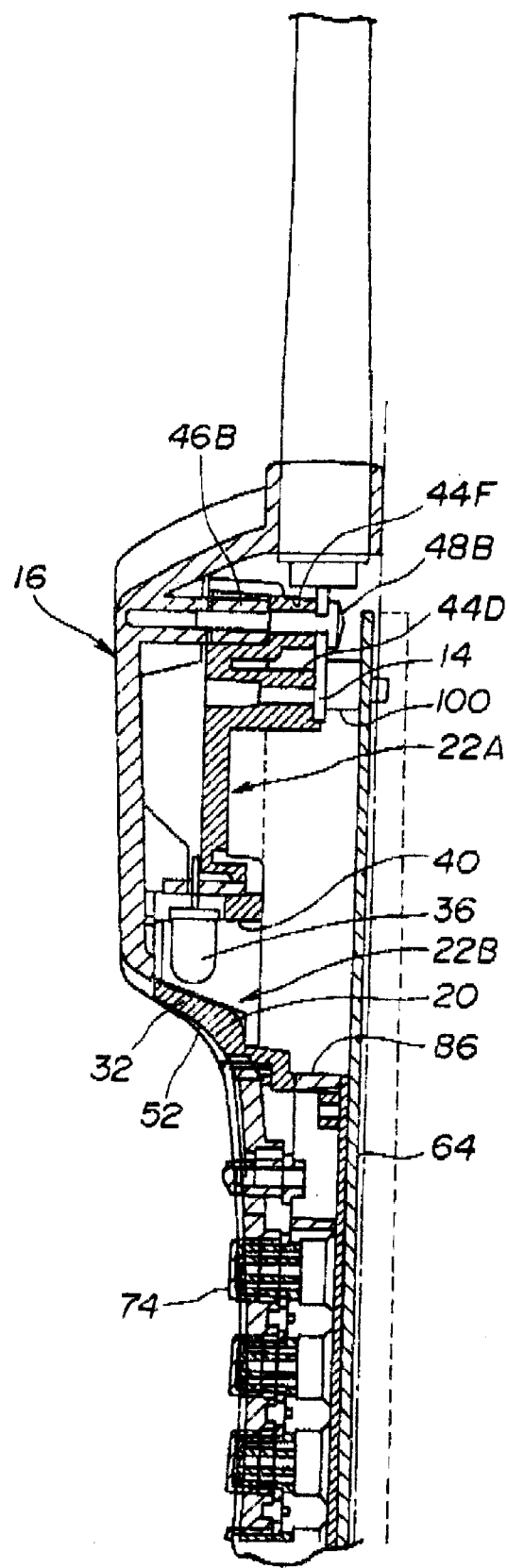
FIG. 3 is a cross section of the handset unit in FIG. 1 along line 3–3'.
Figure 4:
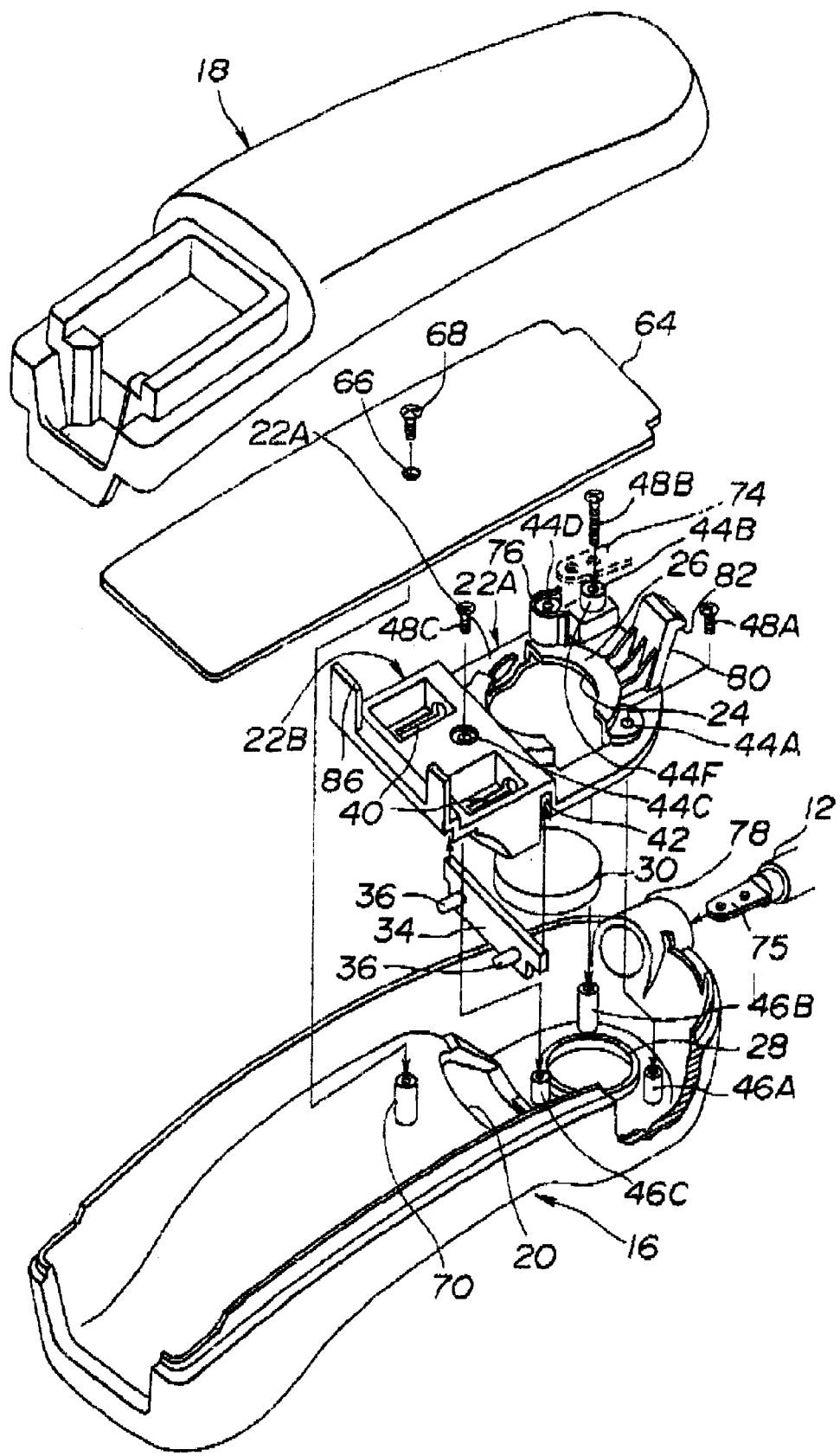
FIG. 4 is an exploded perspective view of the handset unit in FIG. 1.

FIGS. 2 and 3 are cross sections of the handset unit, FIG. 2 is a cross-section of the unit in FIG. 1 along line 2–2', and FIG. 3 is a cross-section of the unit in FIG. 1 along line 3–3', FIG. 4 is an exploded perspective view of this handset unit. As is clear from FIGS. 1 through 4, opening 20 facing operator cover 16C in provided in the lower end in the widthwise direction of receiver cover 16A which has a bulging shape. For convenience, illustration of the rear cover has been omitted in FIG. 3.

Figure 5:
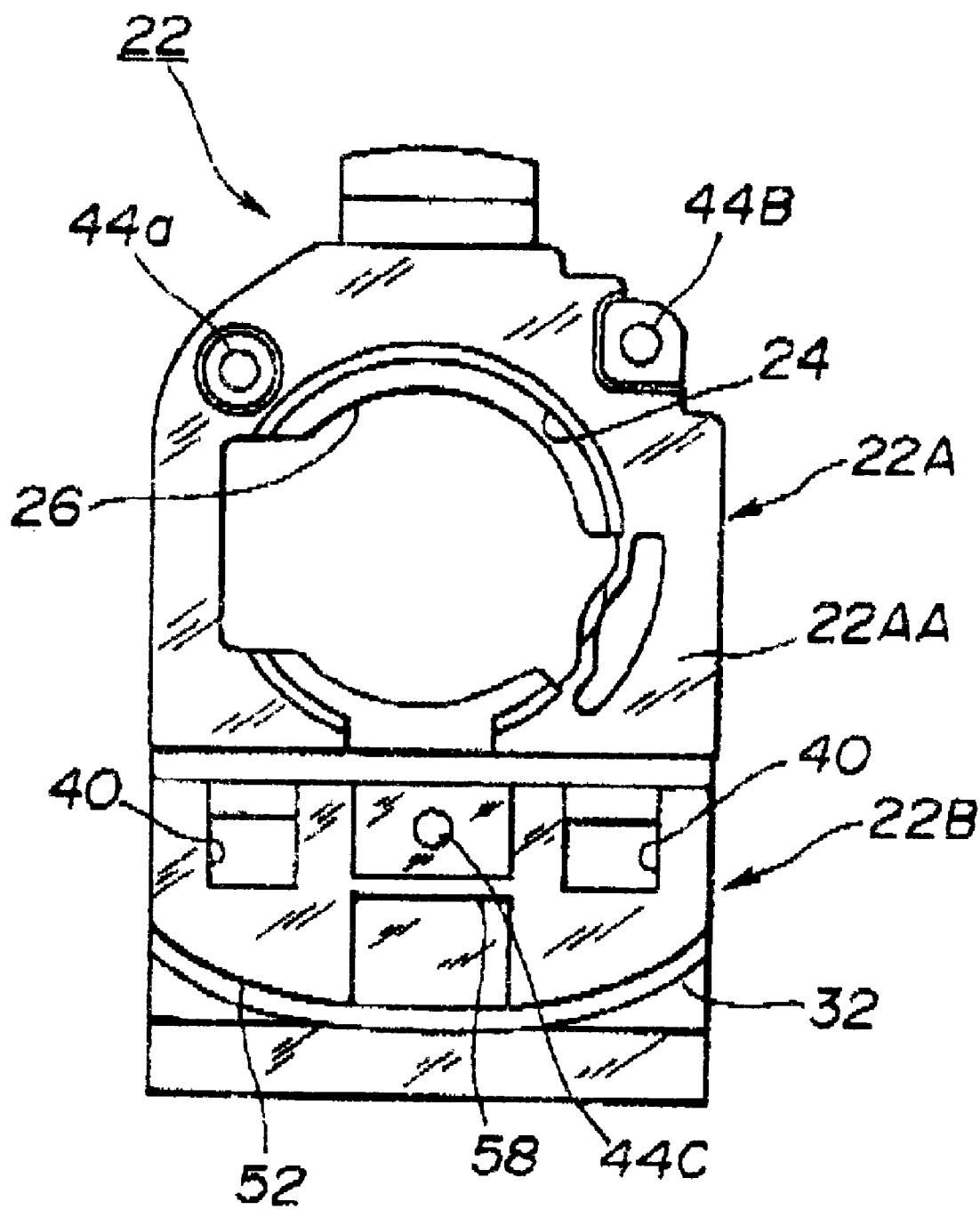
FIG. 5 is a front elevation of the speaker holder which is the receiver.
Figure 6:
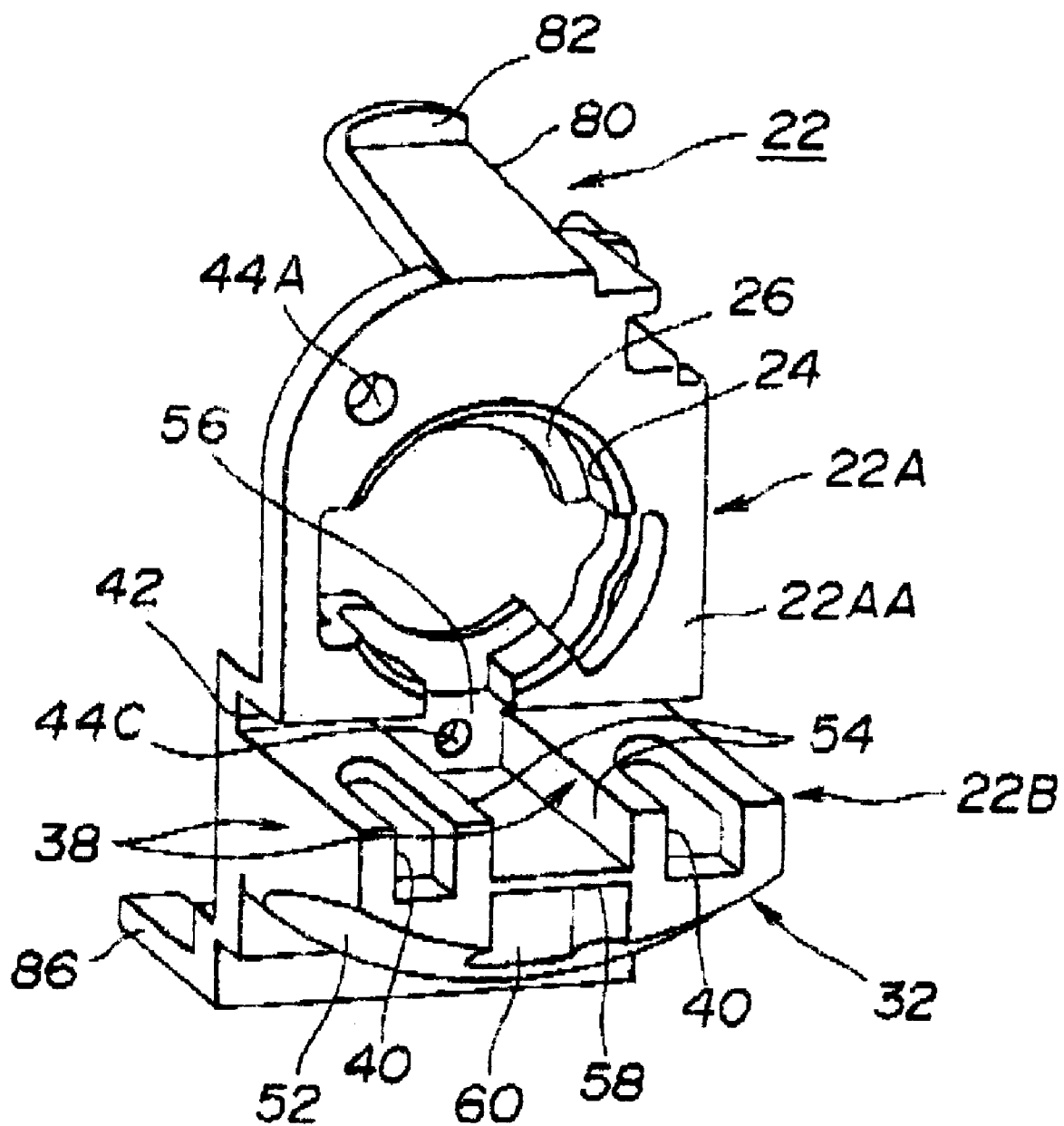
FIG. 6 is a perspective view of the speaker holder in FIG. 5.

FIG. 5 is at front elevation and FIG. 6 is a perspective view of holder 22 of the receiver which is the speaker. FIG. 4 illustrates this speaker holder from the rear face. Speaker holder 22 comprises a main body 22A for supporting the speaker and a translucent window member 22B formed integrally with such main body. This translucent window member functions as a transparent window covers said opening 20 and comes out at said opening.

As shown in FIGS. 5 sand 6, this holder body 22A has a circular channel 24 broken out In substantially circular shape and a circular flange 26 protruding in radial direction from this circular channel, and, as shown in FIG. 4, holds a circular speaker 30 between this circular flange 26 and a circular boss 28 which protrudes from the rear face of said front cover in a circular shape to this holder.

Body 22A of said holder and the translucent window member 22B are molded as one body out of transparent resin. As is clear in consideration of FIG. 6 with reference to FIG. 4 this translucent window member 22B is shaped so as to protrude greatly from the bass face 22AA of holder body 22A toward front cover 16 and slightly toward rear cover 18. Therefore, this translucent window member has a shape 32 bulging in a skirt-like manner at the side of the front cover.

As shown in FIG. 4, a pair of light-emitting diodes fixed on both ends of a rectangular small strip 34 stored between this holder 22 and front cover 16. FIG. 6 shows that both ends in widthwise direction of the bulging portion 32 of the transparent window member are provided with a pair of partially bulging areas 38 for storing this pair of diodes. As is also shown in FIGS. 3 and 4, these bulging areas comprise opening 40 for housing light-emitting diodes, which continues from the front cover through the rear cover of the holder and which has a shape corresponding to, but somewhat larger than the shape of the light-emitting diodes.

As shown in FIG. 4 and FIG. 6, said small strip 34 is fitted into a line-formed channel 42 formed between the front cover side of translucent window member 22B and body 22A. Accordingly, a small strip 34 comprising a pair of light-emitting diodes 36 is supported between speaker holder 22 and front cover 16 while storing the light-emitting diodes 36 in the opening into translucent window member for the light-emitting diodes.

As shown in FIGS. 5 and 6, and also in FIG. 4, screw holes 44A, 44B and 44C, through which screws are to be bored are formed on speaker holder 22, namely two in the lengthwise direction in the upper part thereof, and one in the lower part thereof. The pair of screw holes 44A and 44B in the upper part are mounted above opening 24 which supports the speaker, and screw hole 44C in the lower part is provided in a portion of translucent window member 22B.

On the one hand, as shown in FIG. 4, bosses 46A, 46B and 46C with screw channels formed thereon protrude from the rear face of the front cover at positions corresponding to these three screw holes, (Cf. also FIG. 2)

Accordingly, the whole speaker holder 22 composed of body 22A and translucent window member 22B is screwed onto the rear face of front cover 16 at these three boss portions, As shown in FIG. 4, boss 46A corresponds to screw hole 44A, boss 46B corresponds to screw hole 44B and boss 46C corresponds to screw hole 44C. Screws 48A, 48B and 48C are respectively means for screwing the bosses and the screw holes together.

As shown in FIG. 6, said bulging area 36 of translucent window member 22B ends near the lower end of the translucent window member. The lower end of translucent window member 22B including the lower end of this bulging area has a tapered face 52 appearing at the face 20 of the opening of the receiver cover portion of the front cover (cf. FIG. 2, 3, 5 and 6).

As shown in FIG. 6, a limited area is formed between sides 54 of the pair of bulging areas 38 and base face 56 of the translucent window member and partitioned by these faces and the base face. This limited area is provided with a plate strip 58 which is integrated therewith and protrudes vertically therefrom. This plate strip halves this limited area in the lengthwise direction of holder 22 and is provided as one body with the sides of the pair of bulging portions 38 in a manner so as to connect those faces which face each other.

As shown in FIG. 6, first lower recess 60 in the limited area halved by the thin plate engages with a hook, as will be described below. One of said screw holes, 44C, is formed near the neighboring plate strip of second recess 62 via the first recess and this plate strip 58, and said boss 46C is stored inside this second recess (cf. FIG. 2).

As shown in FIG. 4, main substrate (wiring substrate) 64 exists at the rear face of speaker holder 22 on the side of rear cover 18, and this main substrate is screwed and fixed on boss portion 70 of front cover 16 via screw 68 fitted through screw hole 66. This main substrate has mounted thereon at a position corresponding to the operator cover 16C of said front cover a light-emitting diode 72 indicating to the user that the handset unit is in a state of transmission or reception (cf. FIG. 2), and contact circuits corresponding to keytops.

The front cover comprises a plurality of keytop openings for exposure on the keytop. The above-mentioned operator is formed by the keytops 74 exposed by these openings (cf. FIGS. 1 through 3) and contact circuits corresponding to these keytops.

As shown In FIG. 4, a plurality of bosses 44F and 44D protrude from the rear face in the vicinity of the upper end of said speaker holder 22 towards the side of rear cover 18 for screwing the end of antenna 12 to the holder. One of said bosses, boss 44F, comprises the above-mentioned screw hole 44B at its tip end. Boss 44D comprises a crust 76 which engages with the tip end of plate 75 at the end of the antenna.

Boss 44F hats screwed thereon a screw 48B at the screw hole formed in plate 75 of the end of the antenna. In other words, screw 48B functions so as to fix the antenna to boss 44F while fixing speaker holder 22 to boss 46B of the front cover.

As shown in FIG. 4, crust 78 for fitting the antenna therethrough is formed as one body with front cover 16 in the vicinity of the left of the rear face of said front cover 16. Plate contact point 75 at the antenna end fitted in the front cover from this crust is screwed on speaker holder 22 as described above. Furthermore, reference numeral 100 in FIG. 3 indicates a spacer for connecting plate-form contact point 75 of this antenna with a circuit mounted on said main substrate 64.

As shown in FIG. 6 and FIG. 4, plate strip 60 having et substantially rectangular shape protrudes from the uppermost end of the rear face of speaker holder 22 toward rear cover 18. This plate strip 80 is molded as one body with holder 22, and a claw 82 bent upward exists on the tip end thereof. This claw 82 engages with the upper end of rear cover 18. Through this engagement between this claw 82 and the rear cover, rear cover 18 is fixed to front cover 16.

When translucent window member 22B of said speaker holder is faced toward opening 20 formed on receiver cover portion of the front cover, one end of the front cover which faces this opening (58A in FIG. 7 described below) and said plate strip 58 and base face 56 together form a channel 84 for engagement of the handset unit with the hook of the receiving base, i.e. at a position corresponding to said first recess 60 (cf. FIGS. 1 and 2).

On the other hand, as shown in FIG. 4, a pair of filaments (leg strips) 86 protrude in substantially vertical direction toward substrate 64 from the vicinity of the widthwise ends of the lower rear faces of translucent window member 22B of this holder. This leg strip 86 has a length so that its tip end reaches substrate 64 when holder 22 is fixed onto front cover 16 (cf. FIG. 3).

Now, the movements of the embodiment will be explained. At this stage, a stress greater than necessary is likely to be applied to hook-engaging recess 60 from the hook when trying to engage this handset unit with the wall-hanging hook.

Figure 7:
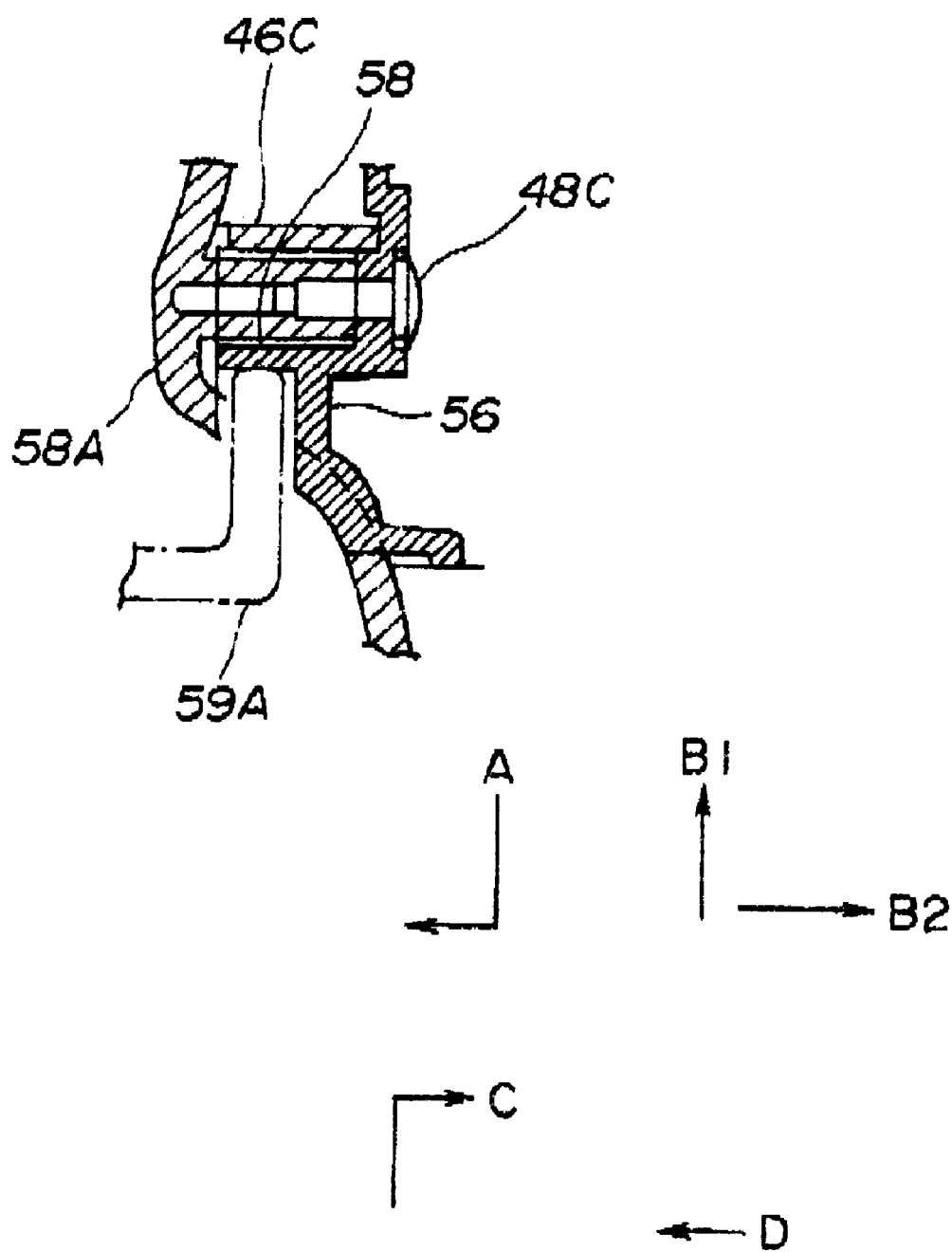
FIG. 7 is a partial cross section indicating a state wherein a hook is engaged in the hook engaging channel.

FIG. 7 is a partial cross-section showing the engagement of hook-engaging channel 84 with hook 59A. When engaging the hook inside this channel, the hook experiences a stress in direction B1 of plate strip 58 by moving this channel 84 in direction A as in FIG. 7. Furthermore, a stress in direction B2 is likely to be applied to base face 56 which is the rear face of translucent window member. At this time, if translucent window member 22B is only arranged to cover opening 20 of the front cover, it is not sufficient for the translucent window member to resist this stress, and the translucent window member 22B may possibly be mechanically injured, such as cracked, or split.

In this embodiment, one of the screw holes, 44C, for fixing holder 22 to the front cover is provided adjacent to hook recess 60 (cf. FIG. 6), and one of the bosses, 44C, of the front cover and translucent member 223 of the holder are mutually screwed together via screw 48C, thereby supporting the holder by the front cover near this recess 60.

As described in FIG. 6 and FIG. 3, this recess 60 is formed from the lower end of said translucent window member to said plate strip 58 near the lower end. Above-mentioned leg strip 86 protrudes from the lower end adjacent to this recess of this translucent window member, and the tip of this leg strip contacts substrate 64. Accordingly, translucent window member 22B is supported by front cover 16 through substrate 64 and this leg strip 86.

Furthermore, as shown in FIG. 2, second recess 62 located adjacent to said first recess 60 stores boss 46C protruding from the rear face of the front cover, so that plate strip 58 is reinforced by resisting the stress applied to plate strip 56, and thereby reinforces the vicinity of the hook engaging recess of the translucent window member.

A mechanism of supporting the translucent member as stated above, or a mechanism of reinforcing such is provided in the vicinity of hook engaging recess 60, i.e. so as to be positioned adjacent to this recess, so that resistance can be effected against stress (B1 and 32 in FIG. 7) applied more than necessary to the holder of this embodiment. Accordingly, even when the wall-banging hook engages with this recess, the hook engaging recess of this translucent window member is prevented from incurring mechanical injury, and thereby prolongs the life of the handset unit.

On the other hand, when removing the handset unit from the hook, engaging channel 84 takes the movement path in direction C as In FIG. 7. At this time, a stress in direction D may be applied to end 58A of the receiver cover of the front cover near opening 20. However, boss 46C is mounted integrally with front cover 16 In the vicinity of end 58A, so that it cam reinforce end 58A against this stress D.

Furthermore, as translucent window member 22B is molded as one body with speaker holder body 22A, it is possible to mold the translucent window member at the same time by using the speaker holder mold. Accordingly, the number of components is reduced and the manufacturing cost for the handset unit can be reduced.

Furthermore, as it is possible to integrate the step of fixing the speaker holder to the handset cover and the step of fixing the translucent window portion to said opening 20, it is possible to enhance effective operations at the handset unit manufacture. In other words, the conventional screwing step for fixing the speaker holder to the handset cover required a plurality of screwing operations (at normally three locations), but one of these screwing operations is used for fixing the translucent window member to the handset cover. Therefore, it is possible to omit a special operation for fixing the translucent window member only to the handset cover.

Furthermore, said hook engaging recess 60 is formed at substantially the center of the translucent window member, so that when engaging the hook with the recess, the handset unit can be hung on the hook in a balanced state.

It is also possible to support the speaker holder by the rear cover. The speaker holder which is composed of said translucent window member and the holder body is manufactured by using transparent ABS resin. An Inexpensive type handset unit omitting light-emitting diodes as illumination devices can use speaker holders molded out of colored resin. Accordingly, the speaker holder according to the present embodiment is also applicable to handset units which include illumination devices and handset units omitting this.

As explained above, the present invention provides a handset unit which requires no metal mold for manufacturing said window member and thus causes no increased manufacturing costs and which can be manufactured without requiring a special step for attaching the window member only to the handset unit cover.

According to the present invention, the forming of a recess on the window member for engagement with the hook also prevents mechanical injury to the window member.

According to the present invention, it is possible to manufacture handset units without requiring a special step for attaching the window member only to the handset unit cover.

Explanation of Reference Numerals 12 antenna
10 handset cover
16 front cover
18 rear cover
20 opening
22 speaker holder
22A holder body
22B translucent window member
30 speaker
36 light-emitting diode
44A through C screw holes
46A through C bosses
48A through C screws
60 first recess (hook engaging recess)
62 second recess
64 wiring substrate
74 keytop 4
84 hook engaging channel
86 leg strip

What is claimed is:

1. A handset unit comprising:
    a handset cover including a front cover containing an opening therein, and a rear cover;
    a speaker holder disposed within said handset cover, said speaker holder including:
        a main body for securely retaining a speaker device, and
        a window member fixed to said main body, said window member extending through and covering said opening; and
    a lighting mechanism for supplying illuminating from said opening toward a front face of said front cover via said window member and illuminating a plurality of keytops.

2. A handset unit according to claim 1, further comprising:
    a transmitter; and
    an operator for containing said plurality of keytops;
    wherein:
        said front cover includes a speaker cover portion which covers said speaker device, a transmitter cover portion which covers said transmitter, and an operator cover portion which covers said operator and exposes said plurality of keytops,
        said opening is in an area of said front cover which faces said operator cover portion, and
        said lighting mechanism is provided near said window member and inside said speaker cover portion.

3. The handset unit according to claim 1, wherein said window member includes a recess for engagement with a hook, and means for supporting said window member against said handset cover near said recess.

4. The handset unit according to claim 3, wherein said means for supporting said window member includes a mechanism for screwing said window member into said handset cover.

5. The handset unit according to claim 3, wherein said window member is supported against said handset cover at a location adjacent to said recess.

6. The handset unit according to claim 3, wherein said window member is directly supported against said handset cover by said supporting means.

7. The handset unit according to claim 4, wherein said screwing mechanism screws into said member through a boss which protrudes toward said member from said rear cover.

8. The handset unit according to claim 3, wherein said means for supporting said window member comprises a strip for resisting the curvature of said window member due to stress.

9. The handset unit according to claim 3, wherein said lighting device is made of a first lighting body and a second lighting body, and wherein said window member includes a first area and second area provided on opposite sides of said recess for storing said lighting bodies.

10. The handset unit according to claim 7, wherein said boss is provided so as to protrude from said rear cover adjacent to said recess.

11. The handset unit according to claim 8, wherein said strip protrudes toward a wiring substrate to be fixed to said handset cover from a rear face of said member, and a tip of said strip contacts said wiring substrate.

12. The handset unit according to claim 7, wherein said boss is provided near a tip of said front cover so as to face said opening.

13. A handset unit comprising:

a handset cover containing an opening therein;

a speaker holder disposed within said handset cover, said holder including a main body for securely receiving a speaker device;

a window member to be fixed in said opening;

said window member having a recess for engagement with a hook; and a mechanism for supporting said window member against said handset cover near said recess.

14. The handset unit according to claim 13, wherein said window member is formed from a resin, and further comprising a lighting mechanism for supplying illumination from said opening onto a front face of said cover via said window member.

15. The handset unit according to claim 13, wherein said supporting mechanism supports said window member directly or indirectly against said handset cover.

16. The handset unit according to claim 11, wherein said recess is formed from a lower end of said window member, and said strip is provided so as to protrude from the lower end of this window member toward a side of said substrate.

17. The handset unit according to claim 4, wherein said means for supporting said window member further comprises a strip for resisting the curvature of said window member due to stress.

18. The handset unit according to claim 3, wherein said window member is fixed to said handset cover.

19. The handset unit according to claim 1, wherein said window member is integrally formed with said main body.

* * * * *